G. S. BENNETT.
APPARATUS FOR AUTOMATICALLY REGULATING, CONTROLLING, AND TIMING FLUID TEMPERATURES.
APPLICATION FILED AUG. 1, 1916.
1,237,458.
Patented Aug. 21, 1917.
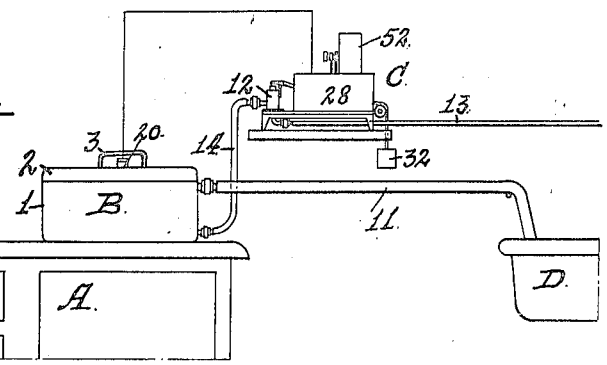
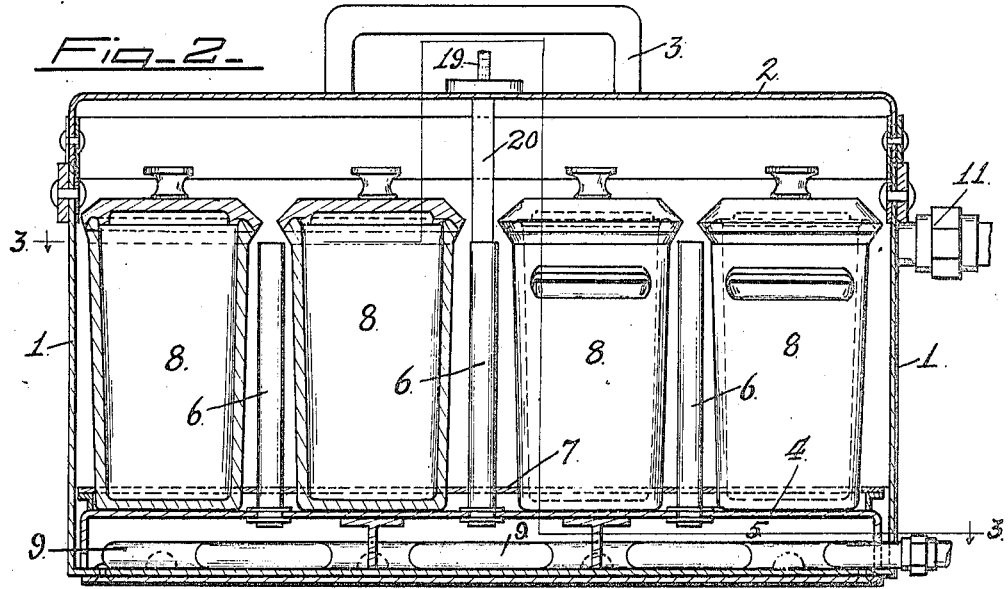
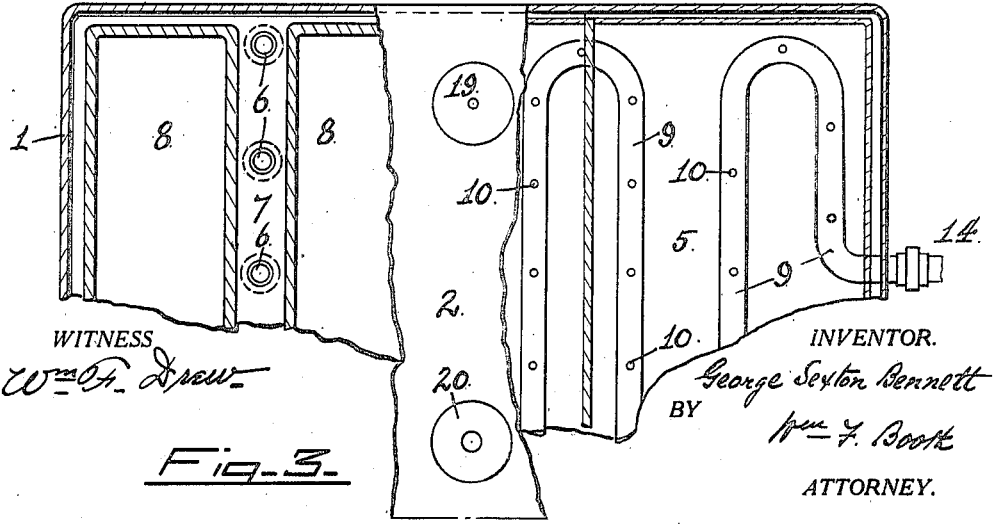
INVENTOR.
George Sexton Bennett
BY
Wm. F. Book
ATTORNEY.

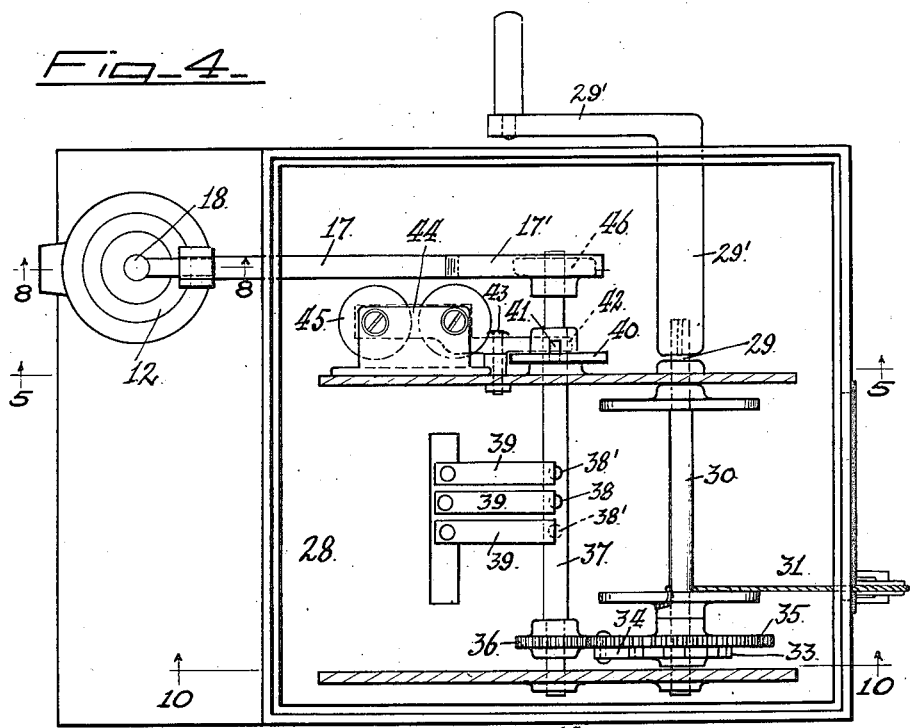

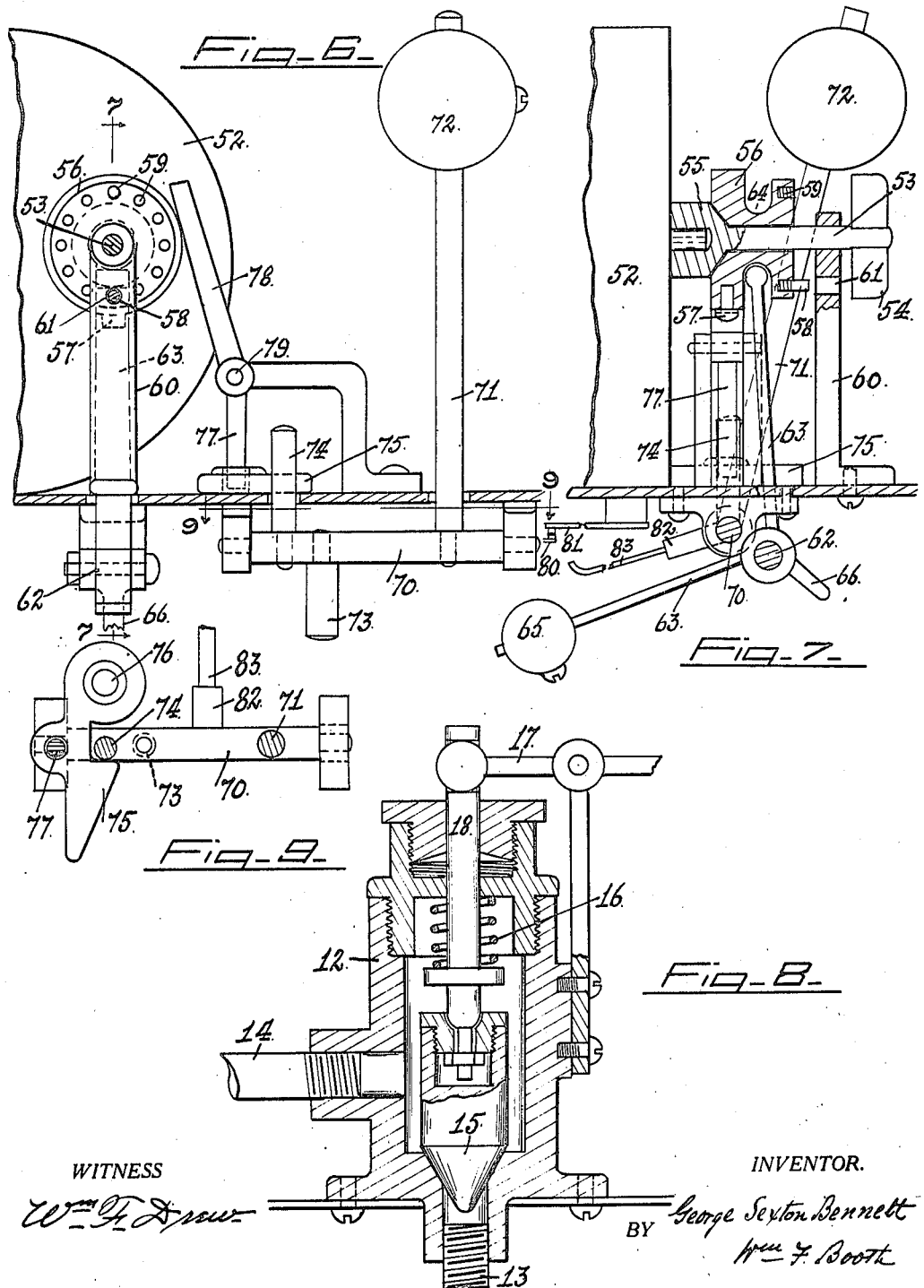

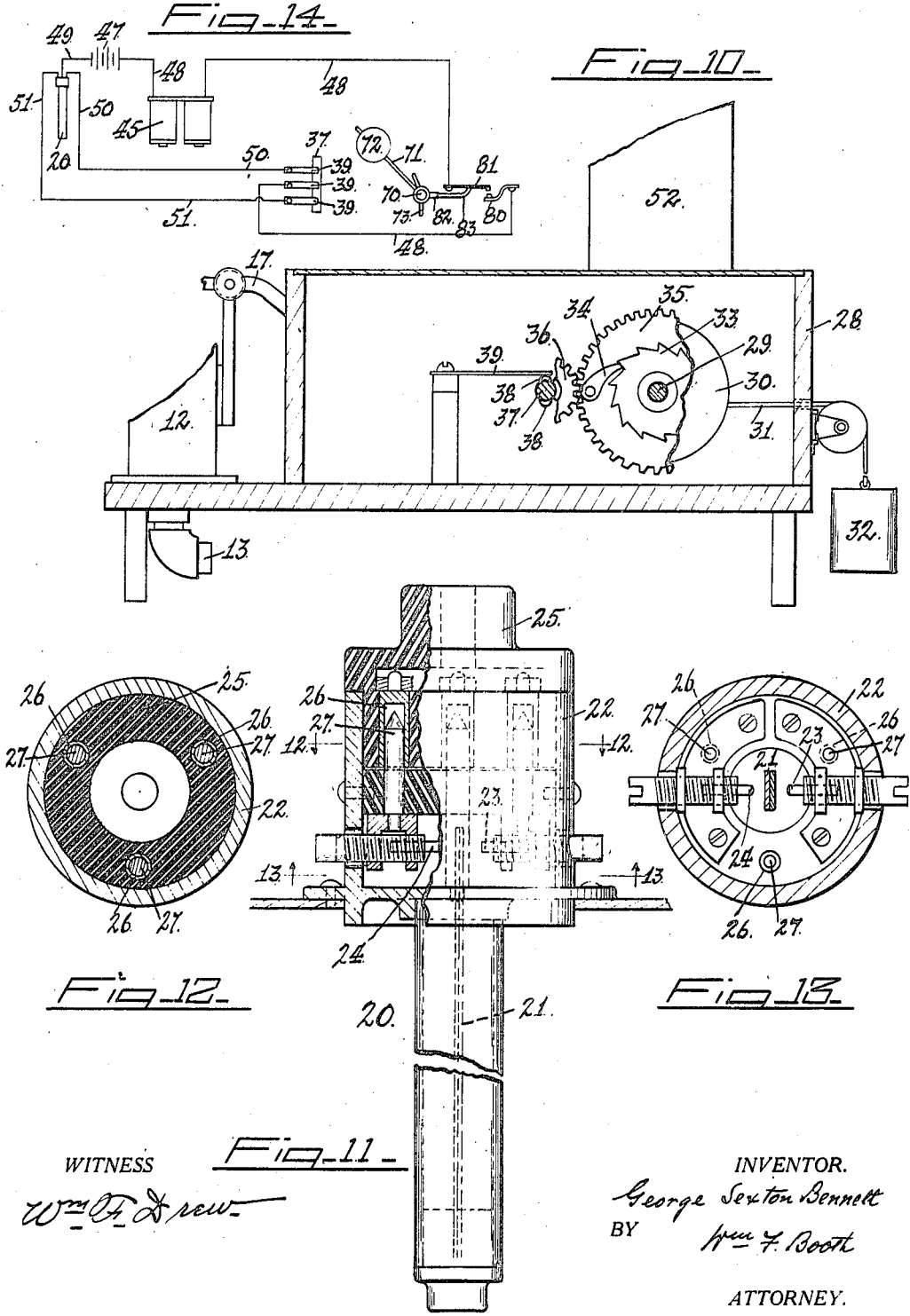

UNITED STATES PATENT OFFICE.

GEORGE SEXTON BENNETT, OF SAN FRANCISCO, CALIFORNIA, ASSIGNOR TO DAVID RUSSELL CARRIER, OF SAN FRANCISCO, CALIFORNIA.

APPARATUS FOR AUTOMATICALLY REGULATING, CONTROLLING, AND TIMING FLUID TEMPERATURES.

1,237,458. Specification of Letters Patent. Patented Aug. 21, 1917.

Application filed August 1, 1916. Serial No. 112,522.

*To all whom it may concern:*

Be it known that I, GEORGE SEXTON BENNETT, a citizen of the United States, residing at the city and county of San Francisco and State of California, have invented certain new and useful Improvements in Apparatus for Automatically Regulating, Controlling, and Timing Fluid Temperatures, of which the following is a specification.

My invention relates to apparatus by which the temperature of fluids may be automatically regulated and controlled and the time during which a given temperature is maintained, may be automatically regulated and determined.

Apparatus of this nature may have a variety of uses, such, for example, as sterilization, or as pasteurization, and may be applied to any fluids requiring such treatment, such as wine, beer, fruit-juices, milk, etc.

In recent years, under the increased and particular attention paid to hygiene along the lines of pure food, the requirements of the law have become more and more specific and stringent. Without referring to the numerous subjects of these requirements, it will be sufficient, in order to point out the object of my invention, to state the case of milk as an example, which will show more fully than any other, the want which my apparatus is intended to fill. The sale of milk is so widely and minutely distributed, that necessarily the small producers amongst the venders are in very large proportion. These have not and cannot well afford to have extensive and costly apparatus to meet the legal requirements of pasteurization. But they all have kitchen stoves, and if these can be made to serve as the heat producers, the greater part of the difficulty will be solved, for an apparatus according to my invention and adapted for such heat source can be made without great cost and for individual use in all cases without regard to the extent of production.

The problem here involved, however, is a serious one, for a stove, especially a kitchen stove, is not in itself adapted for such heat regulation and control as is required for pasteurization.

I do not, therefore, attempt it, but merely use the stove as the source of heat, and this I am enabled to do by the provision of an apparatus to be set upon the stove, and adapted by means wholly independent thereof, to automatically regulate, control and time the temperature of the fluid to be treated, and at the end of the time period, to cool it immediately.

My invention consists in the novel apparatus which I shall now fully describe by reference to the accompanying drawings, it being understood that both description and drawings define the apparatus in its best form, and that many changes and alterations in details may be made without departing from my invention.

In the drawings:—

Figure 1 is an elevation showing the general assemblage of my apparatus.

Fig. 2 is a vertical section of the container.

Fig. 3 is a section, broken, on the line 3—3 of Fig. 2.

Fig. 4 is a top plan of the cold-water valve operating mechanism.

Fig. 5 is a section on the line 5—5 of Fig. 4.

Fig. 6 is an elevation of the timing mechanism.

Fig. 7 is a section on the line 7—7 of Fig. 6.

Fig. 8 is a vertical section of the cold-water valve on the line 8—8 of Fig. 4.

Fig. 9 is a top plan on the line 9—9 of Fig. 6.

Fig. 10 is a section on the line 10—10 of Fig. 4.

Fig. 11 is an elevation, partly in section, of the thermostat.

Fig. 12 is a section on the line 12—12 of Fig. 11.

Fig. 13 is a section on the line 13—13 of Fig. 11.

Fig. 14 is a diagram of the electric circuits.

Referring, first, to Fig. 1—A is a source of heat, for example, a cook-stove as indicated. B is the container for the fluid medium, the temperature of which is to be regulated, controlled and timed. C indicates generally the automatic regulating, controlling and timing mechanism, and D indicates an overflow receptacle from the container.

In Figs. 2 and 3 the fluid container is disclosed in detail.

1 is the shell of the container, having a removable cover 2 of which 3 is the handle. In the base of the shell is a false bottom 4, forming a chamber 5 from which uprising pipes 6 at intervals provide for circulation, and uniform distribution of heat. Resting upon the false bottom 4 is a rack or cage 7 in which are held the vessels 8, which contain the liquid, say milk, to be treated.

Within the bottom chamber 5 of the container shell 1, is a pipe 9, tortuously directed to form a coil. This pipe 9 contains the heat regulating fluid, say, cold water, and its regulating effect upon the main body of water in the container may be by indirection, that is, without delivering any of its water into said main body, or directly, by discharging its water into said main body. This latter is the preferable way, and for this purpose, I have shown in Fig. 3, the top of said pipe 9 as provided with holes 10, properly distributed and of sufficient capacity to produce a uniform and well distributed effect throughout the main body of water.

11 is an overflow pipe from the container shell 1, which pipe, as shown in Fig. 1, leads to the overflow receptacle D.

It will now be seen that the water content of the container when the latter is set on the stove may have its temperature varied by the admission thereto of cooler water from the pipe 9. This variation is regulated and controlled directly by means of a valve 12 which, as seen in Fig. 8, controls the communication of the cold water main 13 with the pipe 14 which supplies the cold water coil 9. The controlling valve 12 may be of any suitable character. I have shown it in Fig. 8 as comprising a shell in which a reciprocative valve-member 15 controls the entrance of the water, said member being normally seated by a spring 16, and is lifted from its seat by means of a lever 17 connected with the valve-member stem 18. The valve 12 is automatically operated by mechanism, as follows:

At 19, in Figs. 2 and 3, is indicated a thermometer which extends down into the main fluid body in the container.

At 20, in Fig. 3, is indicated a thermostat which also extends down into the fluid in the container. In Figs. 11, 12 and 13, I show a form of thermostat adapted for my present purpose. The stem of the thermostat has within it the thermostat tongue or reed 21 composed, as usual, of two metals of different ratios of expansions. The free end of this tongue extends up into the head 22 and is adapted to play between a contact pin 23 on the right and a similar pin 24 on the left. These pins, as will hereinafter appear, are poles of electric circuits. The pins are insulated, and are screwed into their seats so that they may be set up to regulate their position with respect to the thermostat tongue, in order to define the range between any desired degrees of temperature within which the thermostat may operate. 25 is an insulating plug fitted into the head 22, and carries three metallic contact tubes 26 which fit down over three points 27, two of the points being in electric contact with the pole pins 23 and 24, and the third being grounded on the thermostat device.

Mounted upon and within a suitable box 28 are the several transmitting locking and tripping connections which utilize the movement of the thermostat tongue to regulate, control and time the cold water valve 12.

29 is the main power shaft which, through a reel 30, a line 31 and a weight 32, is under constant rotative strain. The shaft carries a ratchet 33, with which a pawl 34 coacts, thereby enabling the weight to be wound up by the application of a crank or key 29' to the shaft 29. Mounted freely upon the shaft is a gear 35, which carries the pawl 34, and said gear meshes with a pinion 36 on a contact-carrying shaft 37, upon which are contacts 38 and 38'. The middle contact 38 is a pair, one on each opposite side of the shaft, while the side contacts 38' are single and are on opposite sides, as seen in Fig. 4. Three brushes 39 make electrical connection with the contacts 38 and 38'.

The shaft 37 has a disk 40 which carries two stop pins 41–180 degrees apart. A swinging catch 42 is adapted to engage these pins successively and when said engagement is in effect the shafts 37 and 29 are locked against rotation. The catch 42 is pivoted at 43 and its other end is formed as the armature 44 of an electro magnet 45.

The operating lever 17 of the cold water valve 12 is extended into the box 28 and its extremity is forked at 17', the arms of said fork lying above and below an eccentric 46 on the shaft 37, with the lower arm held normally against the eccentric, by the spring 16 in the valve structure.

Now, by referring to Fig. 14 wherein the electric circuit diagram appears, it will be seen that from the battery 47 a lead 48 passes through the electro magnet 45 and through a circuit breaker to be presently described, to the middle brush 39. Another lead 49 from the battery is to the ground of the thermostat 20. From the right contact pin 23 of the thermostat a lead 50 runs to one of the side brushes 39 and from the left pin 24 a lead 51 passes to the other side brush 39. It will be well at this point to describe the operation of the apparatus in so far as these devices are concerned.

When the container B is set on the stove, it is filled with water and the milk vessels are within it. The cold water faucet 12 is closed.

The thermostat tongue 21 lies between the two contact pins 23 and 24 without touching either, and the electric circuits are open. The weight 32 is wound up and its shaft 29 is locked by the normal engagement of the catch 42 with the lower pin 41 of the disk 40, due to the gravity of the armature end 44 of said catch.

When the temperature of the water body in the container reaches a predetermined elevation, the thermostat tongue 21 swings over, say to the right and by contact with the right hand pin 23 closes the circuit. The electro magnet 45 being energized, the armature 44 is attracted, thereby tripping the catch 42 from the pin 41 of the disk 40. This frees the shaft 37, and said shaft is given a rotative movement from the power of the weight 32 acting through shaft 29, the ratchet and pawl 33 and 34 and the gear and pinion 35 and 36. The movement of the shaft 37 causes its eccentric 46 to force down the lower arm of the fork 17' of the valve lever 17, and said lever thereby lifts the valve-member 15 from its seat and opens the cold water communication to the cooling coil 9 in the container. Cold water thereupon enters the container.

But the rotary movement of the shaft 37 is only through a half turn, for the moment it begins to turn it breaks the circuit at its contact 38' with the brush 39, and instantly the catch 42 returns by gravity into the path of revolution of the opposite pin 41 of the disk 40; and by engaging said pin, stops the shaft 37, the eccentric 46 still holding down the valve lever 17 and keeping the valve 12 open. The cold water continues to enter the container and lowers the temperature of its fluid content until, within the predetermined degrees, the thermostat tongue moves over to the left contact pin 24. Hereupon another electric circuit is established, with the effect of tripping the shaft 37 to make another half revolution, in which position the eccentric 46 is so situated that the valve 12 is permitted to close by its spring 16, and no more cold water enters the container.

Thus between the predetermined degrees, the temperature is automatically controlled, regulated and maintained.

In the particular application of my apparatus to the use given herein as an example, namely, the pasteurization of milk, there are two further steps to be provided for. One of these is that the predetermined temperature be automatically maintained for a given period of time, and the other is that at the end of said period the milk shall be automatically and promptly cooled.

Taking up these features, my apparatus includes and comprises the following automatic timing mechanism. I will state here that the automatic feature applies both to the beginning of the period and to its termination.

In Fig. 1 the numeral 52 indicates a clock. Referring now to Figs. 6 and 7, 53 indicates a rear extension of the hour-hand-arbor of the clock, the end of said extension having, as shown in Fig. 7, a thumb piece 54 for winding the clock. This rear extension is formed with the fixed member 55 of a conical friction clutch, the other or movable member 56 of said clutch being slidably and rotatably mounted upon said extension. This sliding clutch member is provided with a peripheral pin 57 and a side pin 58. The latter pin is adapted to be removably fitted in any of an annular series of sockets 59 in the face of the clutch member 56. These holes are separated by intervals, say, for example, five minute intervals, as indicated in Fig. 6. 60 is a fixed bracket in which is a hole 61, Fig. 7, in which the side pin 58 of the movable clutch member 56 is adapted to be fitted for initial adjustment.

Pivoted at 62 is a bell-crank lever 63, the upper arm of which lies in an annular groove 64 of the movable clutch member 56, and the lower arm carries, adjustably mounted thereon, to regulate its pressure, a weight 65. The normal tendency of this weighted lever is to hold the movable clutch member 56 to its engagement with the fixed clutch member 55. But this tendency is initially overcome in setting the device, by a short third arm 66 of the lever 63, which is adapted to be engaged, see Fig. 5, by the hook arm 67 of a gravity bell crank lever 68 pivoted at 69, said lever lying in the path of revolution of the pins 41 of the disk 40 on the shaft 37. The effect and operation of this mechanism may be described as follows:—

First, concerning the automatic initiation of the time period. The clutch member 56 is set initially by manually sliding it back until its pin 58 engages the hole 61 in the bracket 60. Said member is thus kept from turning with the extension 53 of the hour-hand-arbor. But when, as heretofore described, the temperature in the container B rises to its predetermined maximum, and the shaft 37 starts on its first half rotation, the lowermost pin 41 of the disk 40 on said shaft contacts with the lever 68 and forces it outwardly so that the hook arm 67 of said lever releases the short third arm 66 of the weighted bell crank lever 63. This lever under the power of its weight, thereupon slides the movable clutch member 56 over to the left, which thereby disengages its pin 58 from the hole 61, and said member moves over to and remains in engagement with the fixed clutch member 55 on the clock-arbor extension 53. The clutch member 56 thereupon begins its rotation with said extension. This rotation, therefore, begins the time period, as soon as the proper temperature in the container is reached, and the continuance of the rotation marks the duration of said time period.

Now, to automatically end said time period as previously determined, and then to cool the container indefinitely, there is the following mechanism.

Referring to Figs. 6, 7 and 9, 70 is a rock-shaft normally influenced by an arm 71 carrying a weight 72. Fitted to this rock-shaft is an arm 73 which, as shown in Fig. 5, is adapted to contact with the upper arm of the fork 17' of the cold water valve lever 17. The rock-shaft 70 also has a pin 74 with which engages a latch 75 pivoted at 76. With this latch the lower arm 77 of a lever 78 engages. This lever is pivoted at 79, and it lies in the path of revolution of the peripheral pin 57 of the clutch member 56. The relation of the two pins 57 and 58 of the clutch member 56 determines the duration of the time period; that is to say, the initial placing of the pin 58 in a given socket 59 of the clutch member 56, and thus fixing, when said pin is set in the hole 61, the distance of the pin 57 from the trip lever 78, determines the time before which said pin 57 will reach and operate said trip lever. When it does reach it, it moves said lever, which in turn throws the latch 75 from its engagement with the pin 74 of the rock-shaft 70. The shaft 70 being free, will turn under the influence of its weighted arm 72, so that its arm 73 will press down upon the upper member of the fork 17' of the valve lever 17, and will bear down said lever and open the cold water valve 12. This opening of the valve is permanent and the cold water will thereupon enter the container and continue to flow therein, thereby immediately and permanently reducing the temperature and cooling the container contents.

In order to open the electric circuits during this final period, and thereby save the battery, I provide a breaker, which is indicated in the diagram—Fig. 14. It comprises separable contacts 80 and 81. To separate them, there is on the rock-shaft 70, an arm 82, Figs. 7 and 9 with a finger 83 adapted to move one of the contacts away from the other.

A brief résumé of the complete operation may now be given.

When the temperature rises to the predetermined maximum, as defined by the adjustment of the contact pins 23 and 24, the thermostat tongue 21 moving over to one of said pins closes an electric circuit which trips the catch 42 and allows the shaft 37 a half turn on its axis, under the power of the weight 32. This movement has two results. It opens the cold water valve 12, by the eccentric 46 pressing the valve lever 17 down, and it also starts the timing mechanism by tripping the hook arm 67 of the lever 68. Cold water now enters the container B, and as the temperature therein lowers, the thermostat tongue moves over to the other contact pin, and thereupon another circuit is closed with the effect of letting the shaft 37 have another half turn which movement relieves the valve lever 17 of the pressure of the eccentric 46 and permits the valve to close. Within previously determined relatively narrow limits of temperature this operation continues, for a predetermined period which is defined by the initial relative adjustment of the clutch pins 58 and 57. At the termination of this period the lever 78 is operated to trip the latch 75, which has the effect of permanently opening the cold water valve and also opening the electric circuits. The cold water then permanently and indefinitely cools the contents of the container.

Although I have herein described the operation in terms of pasteurization and as effected by means of water of different relative heat, the apparatus may equally well be adapted for other treatments and results and with other media, such as air or steam.

I claim:—

1. An apparatus for the described purpose comprising a container for the fluid to be treated; means for affecting the temperature of said fluid within the container by subjecting it to a fluid of different temperature; means, called into action by a predetermined temperature of the fluid to be treated, for automatically regulating the application of the second fluid; and means set in operation by said regulating means for initiating and completing a predetermined period for said predetermined temperature.

2. An apparatus for the described purpose comprising a container for the fluid to be treated; means for affecting the temperature of said fluid within the container by subjecting it to a fluid of different temperature; and means, called into action by a predetermined temperature of the fluid to be treated, for automatically regulating the application of the second fluid and maintaining said automatic regulation for a predetermined period and then continuing the application of the second fluid indefinitely.

3. An apparatus for the described purpose comprising a container for the fluid to be treated; means for applying heat to the container to raise the temperature of its fluid content; means for affecting the temperature of said fluid within the container by subjecting it to a fluid of lower temperature; means called into action by a given temperature of the fluid to be treated, for automatically regulating the application of the second fluid; means set in operation by said regulating means for initiating and completing a predetermined period for said predetermined temperature.

4. An apparatus for the described purpose comprising a container for the fluid to be treated; means for applying heat to the container to raise the temperature of its fluid content; means for affecting the temperature of said fluid within the container by subjecting it to a fluid of lower temperature; and means called into action by a given temperature of the fluid to be treated, for automatically regulating the application of the second fluid and maintaining said automatic regulation for a predetermined period and then continuing the application of the second fluid indefinitely.

5. An apparatus for the described purpose comprising a container for the fluid to be treated; a pipe leading into said container from a source of fluid having a temperature adapted to affect that of the fluid to be treated; a thermostat applied to the fluid to be treated; means operated by the thermostat for automatically controlling and regulating the admission of the second fluid to the pipe, a timing mechanism set in operation by the thermostat at a predetermined temperature; and means actuated by said timing mechanism at the end of a predetermined period for indefinitely admitting the second fluid to the pipe.

6. An apparatus for the described purpose comprising a container for the fluid to be treated; means for applying heat to the container to raise the temperature of its fluid content; a pipe leading into said container from a source of fluid having a temperature below that of the heated fluid to be treated; means operated by a thermostat for automatically controlling and regulating the admission of the cooler fluid to the pipe; a timing mechanism set in operation by the thermostat at a predetermined temperature; and means actuated by said timing mechanism at the end of a predetermined period for indefinitely admitting the cooler fluid to the pipe.

7. An apparatus for the described purpose, comprising a container; means for applying heat thereto; a thermostat in the container; means for regulating the heat; electrically operated means actuated by the thermostat at a predetermined temperature for operating the heat regulating means, a timing mechanism; means set in action by said electrically operated means for starting the timing mechanism when the predetermined temperature is reached; and means actuated by the timing mechanism after a predetermined period for throwing the heat regulating means out of action.

8. An apparatus for the described purpose comprising a container for the fluid to be treated; means for applying heat to the container to raise the temperature of its fluid content; a pipe leading into said container from a source of fluid having a temperature below that of the heated fluid to be treated; a valve to control the admission of said cooler fluid; a thermostat applied to the fluid to be treated; electrically operated means set in action by the thermostat at a predetermined temperature for operating said valve; a timing mechanism; means set in operation by the electrically operated means for starting the timing mechanism when the predetermined temperature is reached; and means actuated by the timing mechanism for limiting the period of the operation of said valve by said electrically operated means.

9. An apparatus for the described purpose comprising a container for the fluid to be treated; means for applying heat to the container to raise the temperature of its fluid content; a pipe leading into said container from a source of fluid having a temperature below that of the heated fluid to be treated; a valve to control the admission of said cooler fluid; a thermostat applied to the fluid to be treated; electrically operated means set in action by the thermostat for operating said valve; a timing mechanism; and means set in operation by the electrically operated means for limiting the period of the operation of said valve by said electrically operated means and opening said valve and holding it open indefinitely.

In testimony whereof I have signed my name to this specification in the presence of two subscribing witnesses.

GEORGE SEXTON BENNETT.

Witnesses:
 WM. F. BOOTH,
 D. B. RICHARDS.